(12) United States Patent
Murray et al.

(10) Patent No.: US 8,661,836 B2
(45) Date of Patent: Mar. 4, 2014

(54) APPARATUS TO CLEAR OIL FROM THE HOSES AND FRONT END OF A RECOVERY RECHARGE MACHINE

(71) Applicant: Service Solutions U.S. LLC, Wilmington, DE (US)

(72) Inventors: Gary P. Murray, Montpelier, OH (US); Mark McMasters, Owatonna, MN (US); William Brown, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/625,443

(22) Filed: Sep. 24, 2012

(65) Prior Publication Data

US 2013/0014520 A1 Jan. 17, 2013

Related U.S. Application Data

(62) Division of application No. 12/248,352, filed on Oct. 9, 2008, now Pat. No. 8,272,228.

(60) Provisional application No. 61/024,398, filed on Jan. 29, 2008.

(51) Int. Cl.
*F25B 45/00* (2006.01)

(52) U.S. Cl.
USPC .................................. 62/77; 62/149

(58) Field of Classification Search
USPC ............... 62/77, 149, 292, 85, 195, 157, 126
See application file for complete search history.

(56) References Cited

U.S. PATENT DOCUMENTS

| | | | |
|---|---|---|---|
| 4,200,121 A | 4/1980 | Walter et al. | |
| 4,938,031 A | 7/1990 | Manz et al. | |
| 4,939,905 A | 7/1990 | Manz | |
| 5,005,375 A | 4/1991 | Manz et al. | |
| 5,010,743 A * | 4/1991 | Hale | 62/292 |
| 5,042,271 A | 8/1991 | Manz | |
| 5,080,132 A | 1/1992 | Manz et al. | |
| 5,248,125 A | 9/1993 | Fritch et al. | |
| 5,333,467 A * | 8/1994 | Pearl et al. | 62/77 |
| 5,353,603 A | 10/1994 | Outlaw et al. | |
| 5,560,215 A | 10/1996 | Talarico | |
| 5,626,170 A * | 5/1997 | Parker | 141/98 |
| 5,715,692 A * | 2/1998 | Pappas | 62/129 |
| 5,758,506 A | 6/1998 | Hancock et al. | |
| 6,134,896 A | 10/2000 | Brown et al. | |
| 6,141,977 A | 11/2000 | Zugibe | |
| 6,185,945 B1 | 2/2001 | Pfefferle et al. | |
| 6,202,433 B1 | 3/2001 | Murray et al. | |
| 6,244,055 B1 * | 6/2001 | Hanson et al. | 62/85 |
| 6,334,320 B1 | 1/2002 | Brown et al. | |
| 6,338,255 B1 | 1/2002 | Richard et al. | |
| 6,539,988 B1 | 4/2003 | Cowan et al. | |
| 8,272,228 B2 | 9/2012 | Murray et al. | |
| 2007/0046020 A1* | 3/2007 | Brass et al. | 285/98 |

* cited by examiner

*Primary Examiner* — Mohammad M Ali
(74) *Attorney, Agent, or Firm* — Baker & Hostetler LLP

(57) ABSTRACT

A refrigerant recovery unit is provided that can recover and recharge refrigerant. The unit is further configured with a pair of service hoses and a refrigerant control circuit operable to receive and transport the refrigerant between the hoses and the storage vessel and to process the refrigerant to substantially remove contaminants from the refrigerant. A fluid connector is provided in fluid communication with the hoses to enable the refrigerant to flow between the hoses and to establish a closed loop through the refrigerant control circuit, and a controller is operatively connected to the refrigerant control circuit and configured to control a flow of the refrigerant through the refrigerant control circuit and through the fluid connector.

12 Claims, 12 Drawing Sheets

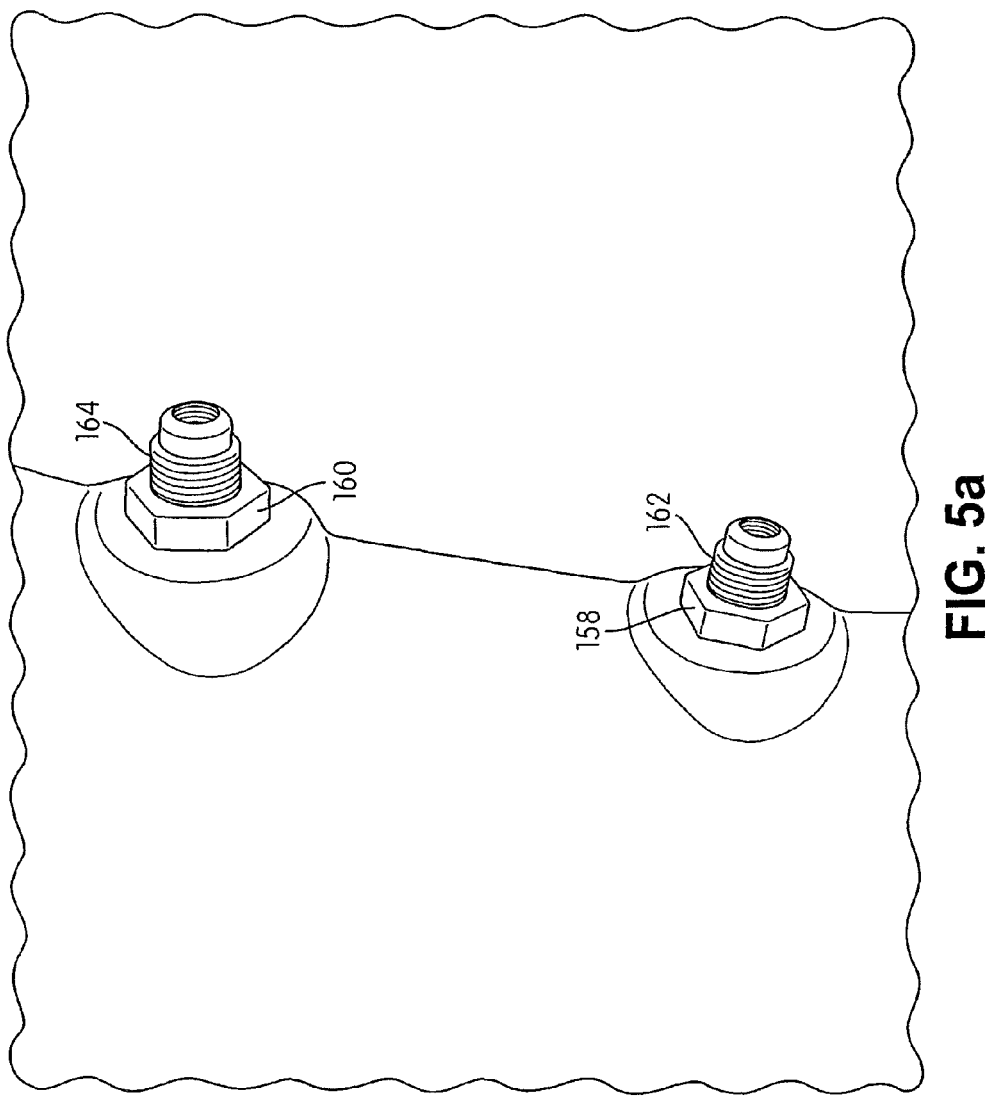

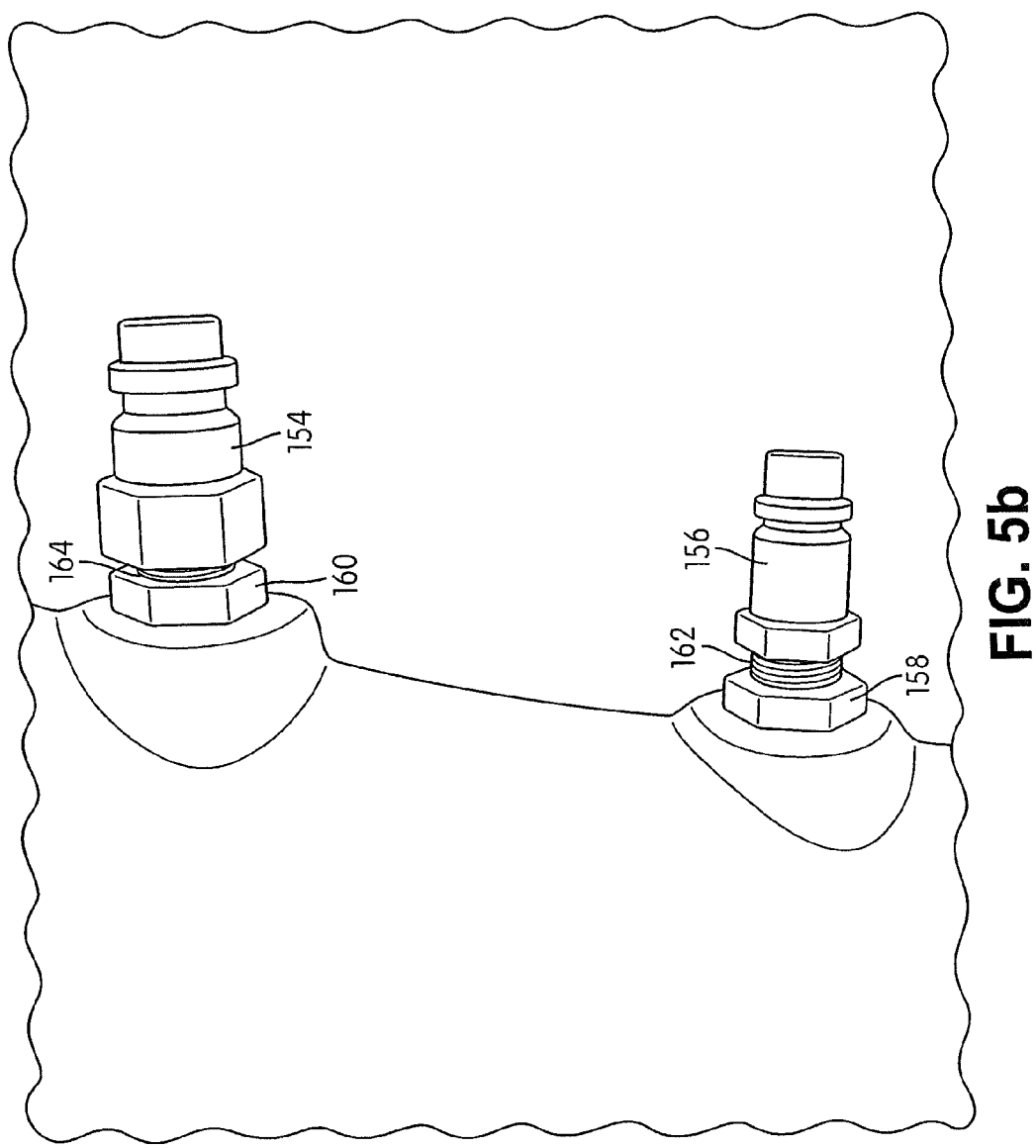

APPARATUS TO CLEAR OIL FROM THE HOSES AND FRONT END OF A RECOVERY RECHARGE MACHINE

CROSS-REFERENCE TO RELATED APPLICATIONS

This application claims priority to and is a divisional of U.S. Patent Application entitled "Apparatus to Clear Oil from the Hoses and Front End of a Recovery Recharge Machine," filed Oct. 9, 2008, having Ser. No. 12/248,352, now U.S. Pat. No. 8,272,228, which claims priority to U.S. Provisional Application entitled "Apparatus to Clear Oil from the Hoses and Front End of a Recovery Recharge Machine," filed Jan. 29, 2008, having Ser. No. 61/024,398, the disclosures of which are hereby incorporated by reference in their entirety.

FIELD OF THE INVENTION

The disclosure generally relates to automotive vehicle air conditioning systems, and more particularly to flushing oil from the hoses of a refrigerant recovery unit that services the air conditioning system so as to not contaminate the oil in an electric hybrid vehicle

BACKGROUND OF THE INVENTION

Automotive vehicle air conditioning (A/C) systems require maintenance. Maintenance includes refrigerant recovery, evacuation, and recharging of the A/C system. Portable refrigerant recovery units are used in connection with this maintenance. The refrigerant recovery units connect to the A/C system of the automotive vehicle to recover refrigerant out of the system, separate out contaminants and oil, and recharge the system with additional refrigerant.

Conventional automotive vehicles typically require a different type of oil than that utilized by hybrid vehicles. These oils are generally not compatible with each other. The hoses of the refrigerant recovery unit need to be flushed before servicing a hybrid vehicle using a different kind of oil than that of conventional vehicles.

SUMMARY OF THE INVENTION

In accordance with one embodiment of the present invention, a method of removing contaminants from a refrigeration recovery unit includes connecting a first end of a high side service hose and a first end of a low side service hose to a first portion of the unit that provides a refrigerant to the service hoses, connecting a second end of the high side service hose and a second end of the low service hose to a second portion of the unit so that the second ends form a closed loop, charging the low side service hose with the refrigerant, wherein the refrigerant flows into the high side service hose, recovering refrigerant from the high side service hose while continuing to charge the low side service hose, charging the high side service hose with refrigerant while recovering refrigerant from the low side service hose, stopping the charging of the service hoses, and recovering refrigerant from the high and low side service hoses until a measured pressure reaches 0 psig.

In accordance with another embodiment of the present invention, a method to flush a contaminant from service hoses of a refrigerant recovery unit includes connecting a first end of a high side service hose and a first end low side service hose to a first portion of the unit that provides a refrigerant to the service hoses, connecting a second end of the high side service hose and a second end of the low service hose to a second portion of the unit so that the second ends form a closed loop, entering a predetermined amount of time for flushing the service hoses, measuring a pressure within the service hoses with a pressure sensor, performing a recovery of refrigerant if there is a positive pressure in the service hoses, determining if there is an adequate vacuum in the service hoses after the recovery, performing an evacuation of the service hoses if the vacuum is inadequate, flushing the service hoses with a refrigerant for a predetermined period of time, and recovering refrigerant from the service hoses.

In accordance with yet another embodiment of the present invention, a refrigerant recovery unit that can recover and recharge refrigerant from a refrigerant system of a vehicle can comprise a storage vessel that contains a refrigerant, a pair of refrigerant service hoses having a first end connected to a first portion of the unit and a second end configured to mate with the refrigerant system, wherein the first end communicates with the storage vessel, a refrigerant control circuit operable to receive and transport the refrigerant between said hoses and said storage vessel and to process the refrigerant to substantially remove contaminants from the refrigerant, a fluid connector in fluid communication with said second ends to enable the refrigerant to flow between first ends and second ends and to establish a closed loop through said refrigerant control circuit, and a controller operatively connected to said refrigerant control circuit and configured to control a flow of the refrigerant through said refrigerant control circuit and through said fluid connector.

In accordance with still another embodiment of the present invention, a refrigerant recovery unit that can recover and recharge refrigerant from a refrigerant system of a vehicle can comprise a means for storing configured to contain a refrigerant, a pair of means for transmitting refrigerant having a first end connected to a first portion of the refrigerant recovery unit and a second end configured to mate with the refrigerant system, wherein the first end communicates with the means for storing, a refrigerant control means configured to receive and transport the refrigerant between said means for transmitting and said means for storing and to process the refrigerant to substantially remove contaminants from the refrigerant, a means for connecting in fluid communication with said second ends to enable the refrigerant to flow between first ends and second ends and to establish a closed loop through said refrigerant control means, and a means for controlling configured to communicate with said refrigerant control means and configured to control a flow of the refrigerant through said refrigerant control means and through said means for connecting.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5a is a fragmentary view of a portion of an example embodiment of the refrigerant recovery unit in FIGS. 1 and 2 showing bulkhead fittings with nuts attached.

FIG. 5b is a fragmentary view of a portion of an example embodiment of the refrigerant recovery unit in FIGS. 1 and 2 with R-134a adapters tightened onto bulkhead fittings.

FIG. 6b is an exploded view of the fluid connector shown in FIG. 6a.

DETAILED DESCRIPTION

Figure 1:
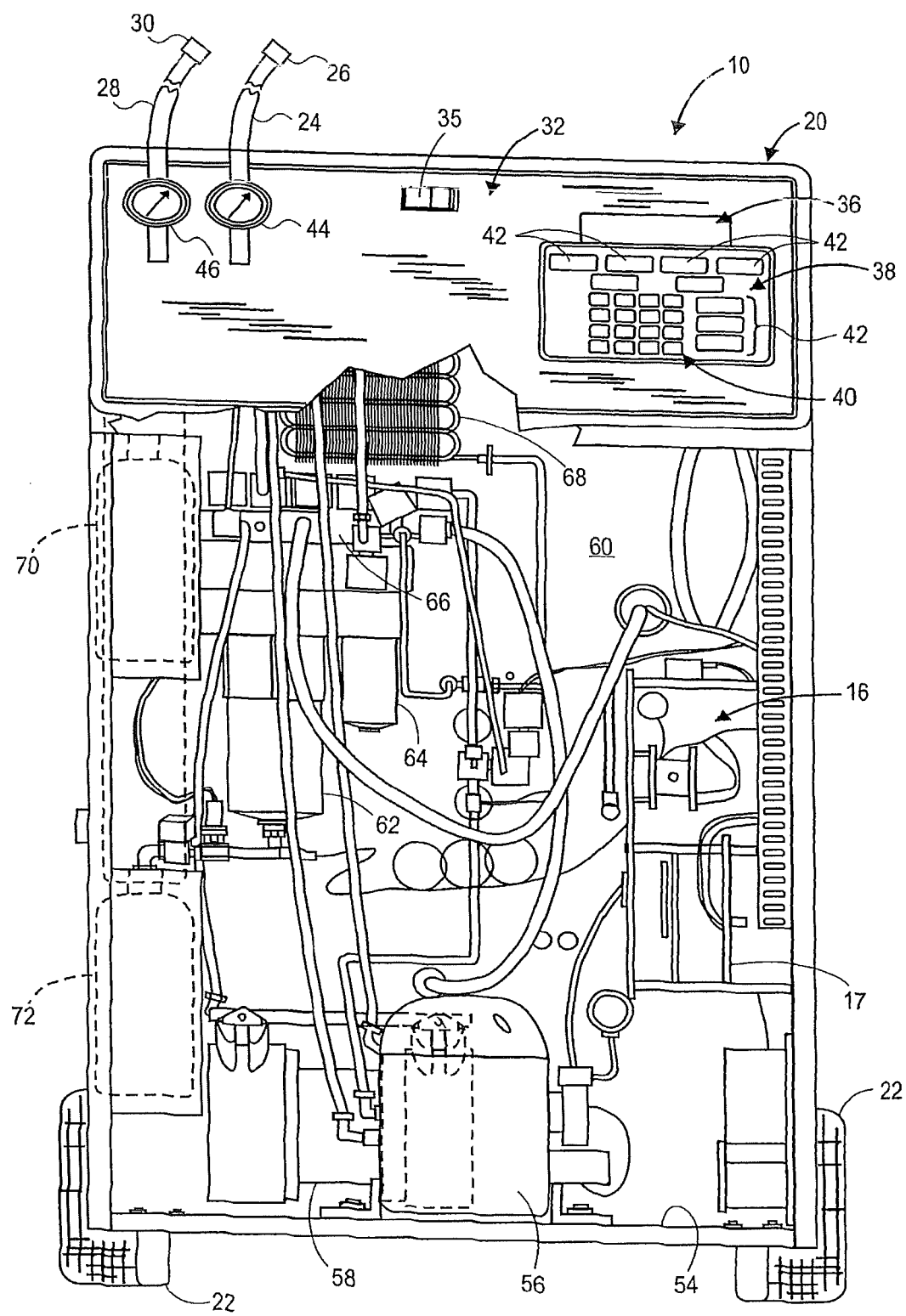
FIG. 1 is a fragmentary front view of an example refrigerant recovery unit shown with a portion of a front cover removed to illustrate major components of the unit.

To enable an operator to use the same refrigerant recovery unit to service both conventional automotive vehicles and hybrid vehicles, an apparatus and method are developed to flush oil and other contaminants from the vehicle service hoses and associated refrigerant control circuit. Once the flushing process is completed, the refrigerant recovery unit can be used on a vehicle having a different refrigerant oil than the refrigerant oil from the previously serviced vehicle.

According to an embodiment of the invention, a refrigerant recovery unit 10 is provided that can recover and recharge refrigerant from a refrigerant system 124 which comprises a storage vessel 12 constructed and arranged to hold a refrigerant. The refrigerant recovery unit 10 is configured with a refrigerant control circuit operable to receive and transport the refrigerant between the vehicle's refrigerant system and the storage vessel 12 and to process the refrigerant to substantially remove contaminants therefrom. A fluid hose 166 is provided to be in fluid communication with the hoses 24, 28 to enable the refrigerant to flow between the hoses 24, 28 and to establish a closed loop through the refrigerant control circuit. An electronic controller 16 is operatively connected to the refrigerant control circuit and configured to control a flow of the refrigerant through the refrigerant control circuit and through the fluid hose 166.

Figure 2:
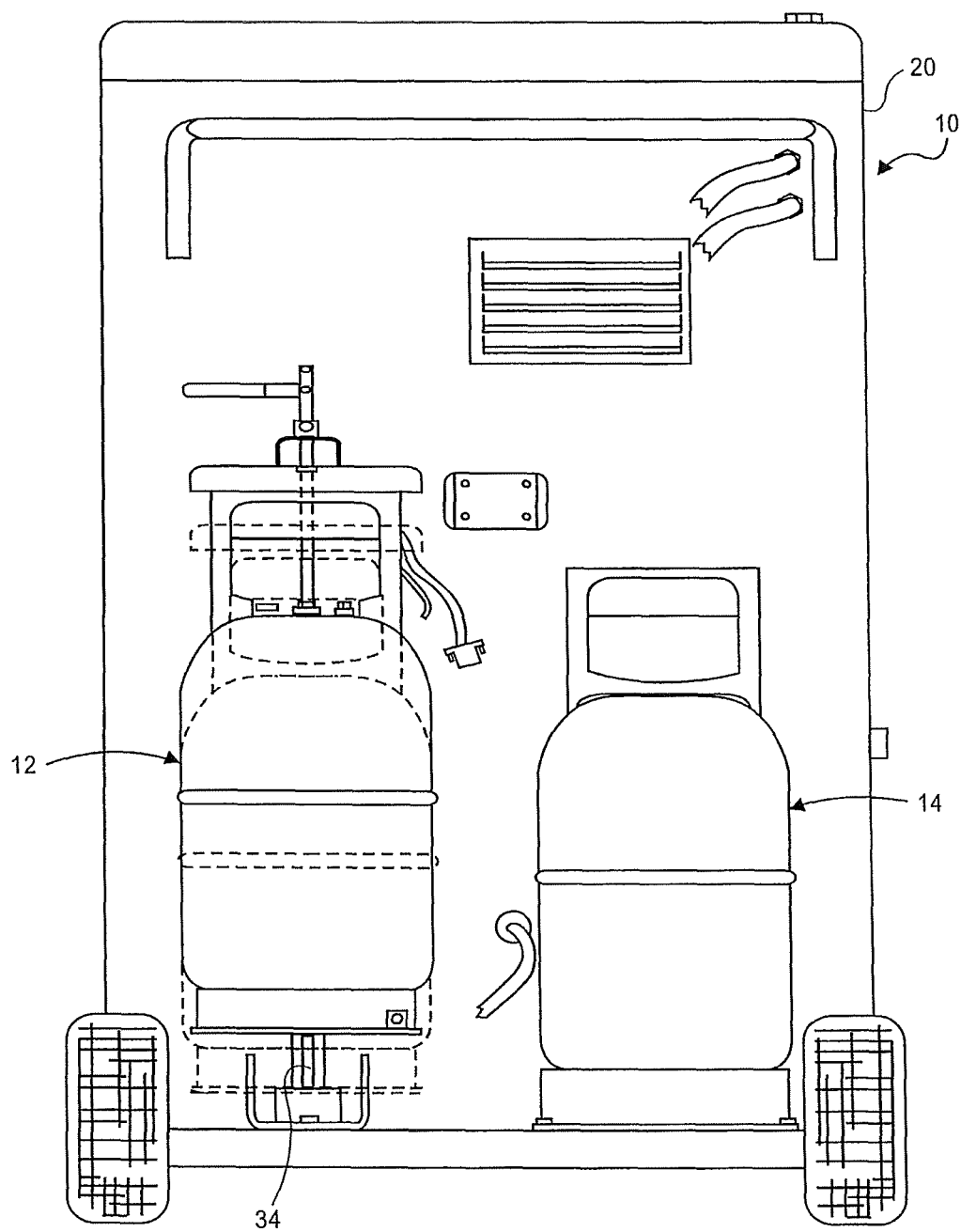
FIG. 2 is a fragmentary rear view of the refrigerant recovery unit shown in FIG. 1.

The invention will now be described with reference to the drawing figures, in which like numerals refer to like parts throughout. FIGS. 1-2 show one example of a portable refrigerant recovery unit 10 used to recover and recycle refrigerant from a refrigerant system, such as the A/C system in an automotive vehicle. The unit can be mobile via wheels 22 located on a bottom end of the unit 10. The unit 10 includes a first container or main tank 12 for holding a primary supply of refrigerant or recovered refrigerant that has been recovered from the A/C system. The main tank 12 may also be referred to as an internal storage vessel (ISV), and is the primary supply of refrigerant. The unit 10 also includes a second container or auxiliary tank 14 for holding a secondary supply of refrigerant. The secondary supply of refrigerant is sometimes referred to as fresh refrigerant, virgin refrigerant or recharging refrigerant. The auxiliary tank 14 is arranged in fluid communication with the main tank 12 so fluid can be transferred from the auxiliary tank 14 to the main tank 12. The electronic controller 16 along with the internal valves and hoses (FIG. 3) controls the transfer of fluid from the auxiliary tank 14 to the main tank 12.

Details of the structure and operation of the example embodiment of a refrigerant recovery unit 10 is illustrated in several of the figures. FIG. 1 shows one example of a refrigerant recovery unit 10 for servicing a refrigerant system of a vehicle air conditioning system. The front panel of a cabinet 20 is shown broken away in FIG. 1 to show the major elements of the refrigerant recovery unit 10. Behind the front panel of cabinet 20 is mounted the main tank 12 of refrigerant (FIG. 2) for supplying refrigerant to the system being serviced. Also mounted adjacent the main tank 12 is the auxiliary supply tank 14 which supplies the additional refrigerant to the main tank 12. Mounted to the floor 54 of cabinet 20 is a compressor 56 and a vacuum pump 58. The compressor 56 and the vacuum pump 58 may be connected in series, and operate together or separately. The compressor 56 and the vacuum pump 58 together and individually are an example of a fluid recovery assembly and a fluid recovery means. Mounted to the inside of rear wall 60 of cabinet 20 is an oil accumulator tank 62, a compressor oil separator filter 64, a manifold 66 (shown as a node in FIG. 3), and a condenser 68. In addition, a fresh oil canister 70 is mounted within a side compartment of cabinet 20. A recovery oil container 72 is mounted on the lower part of the cabinet 20 to receive oil drained from the accumulator tank 62.

Figure 3:
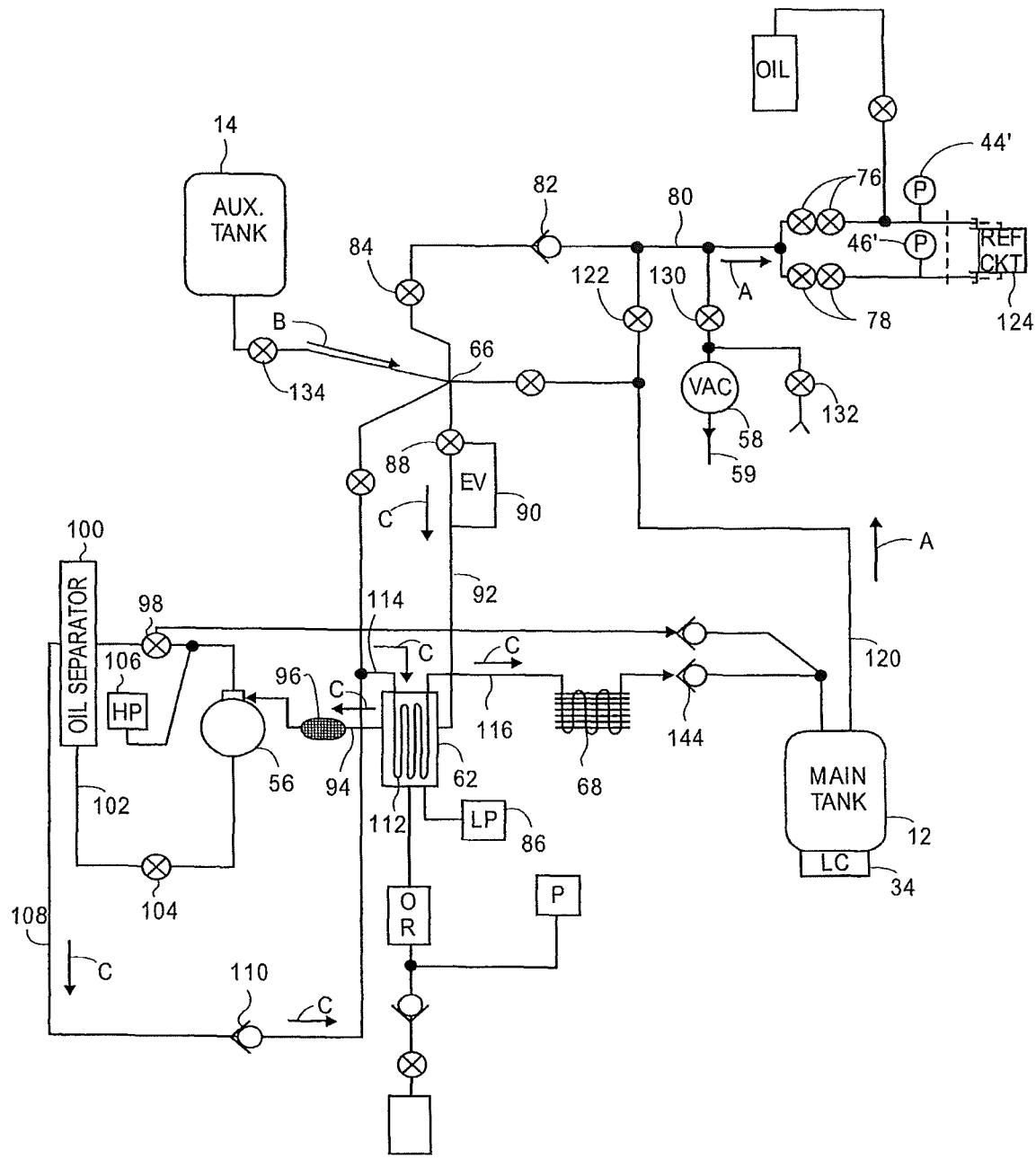
FIG. 3 is a flow diagram of the refrigerant recovery unit shown in FIGS. 1 and 2 according to an embodiment of the invention.

The main tank 12 rests on the weighing device 34, which in this example is a load cell, as shown in FIGS. 2 and 3. The weighing device 34 provides a weight data signal to the controller 16 such that the weight of the tank comprising its tare weight plus the weight of refrigerant therein are monitored by the controller 16. High pressure hoses and connectors together with control valves couple tank 14 to tank 12. In addition, the refrigerant recovery unit 10 may include a high pressure hose 24, typically color coded red, with a coupling 26 for coupling to the vehicle's high pressure fluid transmitting port (not shown) and a low pressure hose 28, typically color coded blue, having a coupling 30 for coupling to the low pressure fluid transmitting port (not shown) of the vehicle's refrigerant circuit. The couplings 26, 30 have valves incorporated therein, so that they when the valves are closed, no refrigerant can flow through them. The hoses 24, 28 are an example of a fluid connector or fluid connector means. Electrical pressure transducers 44' and 46' (shown in FIG. 3) are coupled to the hoses 24 and 28 (shown in FIG. 1), and are coupled to the controller 16 through conventional input/output circuits to provide the controller 16 with pressure information during operation of the unit 10.

Figure 4:
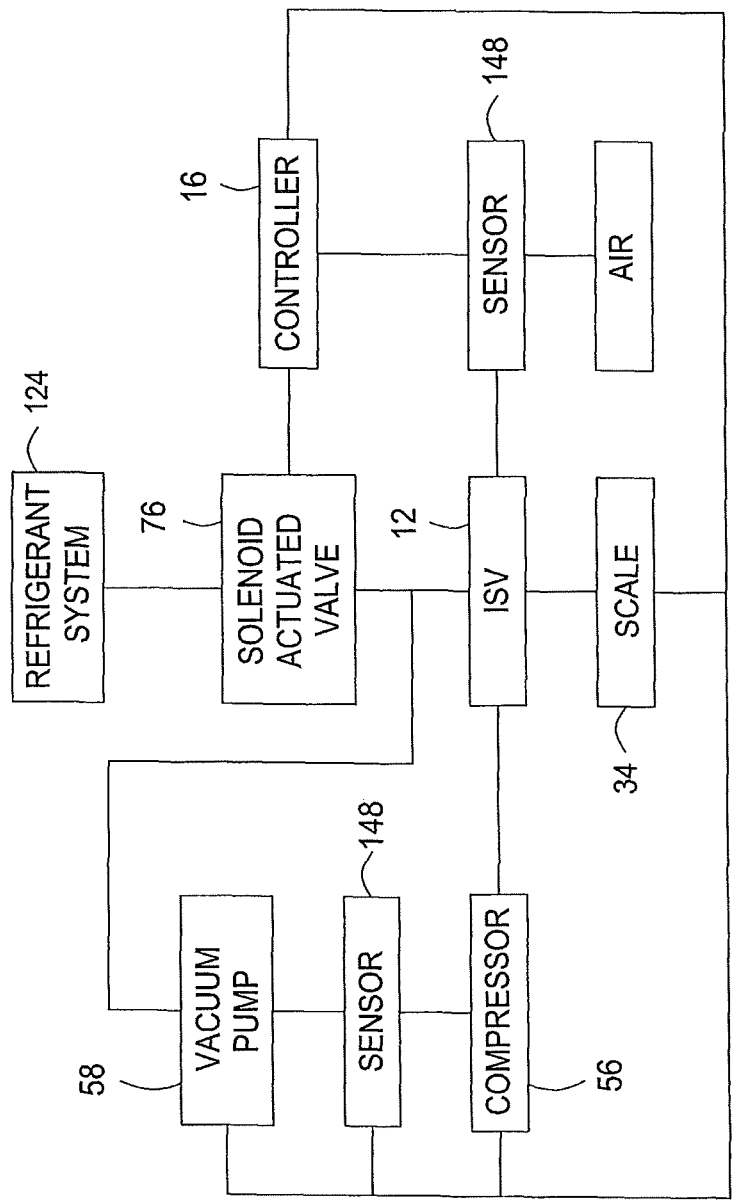
FIG. 4 is an example embodiment of a block diagram of a portion of a refrigerant recovery unit.

The refrigerant recovery unit 10 includes the electronic controller 16 which includes a microprocessor on a circuit board 17, for controlling among other elements an electromechanical solenoid valve 134 (FIG. 3). The microprocessor may be configured with internal memory to store and record data. Optionally, the microprocessor may be configured with an external memory unit to store software and data, and the microprocessor may be coupled to the memory unit for executing the software stored in the memory unit. The external memory unit may be contained within the cabinet 20 or external to it. The electronic controller 16 receives data signals or communication from sensors, including pressure and temperature sensors, for example, as shown in FIG. 4, controls switches, such as the on and off switch 35 on the control panel 32 shown in FIG. 1, and weighing device 34. The weighing device 34 in the example embodiment is a load cell, but the weighing device can be an electronic scale or any other type of weighing device configurable to transmit a weight data signal to the controller 16.

The control panel 32 includes a display 36 for displaying the operational status of the unit's operation. The display is coupled to the controller 16 by way of a conventional input/output circuit. The control panel 32 further includes a switch panel 38 having a conventional keyboard 40, and a plurality of push-button switches 42 for controlling the operation of the unit 10 through its various phases of operation and/or for selecting parameters for display.

Having briefly described the major components of the refrigerant recovery unit 10, as shown in FIGS. 1 and 2, a more detailed description of the operation of the system is described in connection with the flow diagram shown in FIG. 3.

FIG. 3 illustrates an example of a refrigerant control circuit in fluid communication with the internal storage vessel or main tank 12 and configured to be connected to a vehicle's refrigerant system 124 to enable refrigerant to flow between the refrigerant system 124 and the main tank 12.

In general, the recovery cycle is initiated by connecting hoses 24 and 28 to the vehicle to be serviced and opening of the dual back-to-back high pressure and low pressure solenoids 76, 78, respectively. This allows the refrigerant within the vehicle to flow through a refrigerant control circuit of the refrigerant recovery unit 10. The refrigerant flows through a conduit 80, through a check valve 82, then through recovery valve 84, and into a manifold 66. The refrigerant then flows through a valve 88 and a unit 90 via conduit 92 into the accumulator tank 62 where it then travels through an output conduit 94 through a water separating molecular sieve 96 and then to the input of the compressor 56. Refrigerant is drawn through the compressor 56 through a valve 98 and through an oil separating filter 100, which circulates oil back to the compressor 56, through conduit 102, and oil return valve 104. The refrigerant recovery unit 10 may optionally include a high pressure switch 106. High pressure switch 106 is coupled to the microprocessor programmed to determine if the upper pressure limit of, for example, 435 psi has been reached in order to shut down the compressor 56 in the event the pressure becomes excessive. The compressed refrigerant then exits the oil separator 100 through a conduit 108, travels through a check valve 110 and then through a heating coil 112 in the accumulator tank 62 via a conduit 114. The refrigerant recovery unit 10 optionally includes a low pressure switch 86 that senses the pressure and provides an output signal coupled to the microprocessor through a suitable interface circuit. The controller 16 is programmed to detect when the pressure is down to 13 inches of mercury in the vehicle's A/C system. The heated compressed refrigerant flowing through heating coil 112 assists in maintaining the temperature in accumulator tank 62 within a working range. The refrigerant then flows through a conduit 116 to the condenser 68 which cools the compressed refrigerant which then flows through a check valve 144 and into the main tank 12.

The evacuation cycle begins by the opening of solenoids 76 and 78 and valve 130, leading to the input of vacuum pump 58. Prior to opening valve 130, air intake valve 132 is opened, allowing the vacuum pump 58 to start exhausting air through outlet 59. The vehicle's refrigerant system 124 is then evacuated by the closing of valve 132 and the opening of valve 130, allowing the vacuum pump 58 to exhaust any trace gases remaining until the pressure in the system 124 is approximately 29 inches of mercury, or approximately 0 psig. When this occurs, as detected by pressure transducers 44' and 46' coupled to the controller 16, the controller 16 actuates valve 130 by turning it off and the recharging cycle begins.

The flow path of the recharging cycle is through an opened charge valve 122 and solenoids 76 to allow the liquid refrigerant in tank 12, which is at approximately 70 psi or above, to flow through conduit 80 to the refrigerant system 124. The flow of refrigerant through high-pressure solenoids 76 is for a predetermined period of time to provide a full charge of refrigerant to the vehicle. The components comprising the recharging cycle flow path are an example of a fluid communication means in fluid communication with the main tank 12 and configured to be connected to the refrigerant system 124 of the vehicle to enable refrigerant to flow between the main tank 12 and the refrigerant system 124.

Having thus described the main operations of the refrigerant recovery unit 10, the structure and operation of the unit 10 to flush contaminants from its vehicle service hoses 24, 28 will be described below.

Conventional automotive vehicle air conditioning systems typically use polyalkylene glycol lubricant ("PAG") oil as a refrigerant lubricant or compressor oil. Many hybrid systems with electric compressors use a different kind of oil, such as a polyolester ("POE") oil. The POE systems in hybrid vehicles are sensitive to an electrical resistivity of the lubricant, because the lubricant contacts the electrical system. PAG oils typically have a lower resistivity than that of the POE oils which can cause a leakage current. For a given voltage, such as 300 volts or the approximate operating voltage for a hybrid system, the lower resistivity translates into a higher leakage current. Thus, if a certain percentage of the PAG oil gets into the hybrid system, the lower resistivity of the PAG oil and the resulting leakage current can cause electrical problems in the hybrid system, including electrical damage.

FIG. 4 is an example embodiment of a block diagram of a portion of a refrigerant recovery unit. The refrigerant system 124 of the vehicle communicates with the solenoid valve 76. The actuation of the valve 76 is controlled by controller 16. A sensor 148 is optionally coupled to the main tank 12 and to the controller 16. The main tank 12 is positioned on the scale 34 and is connected through a connector or other arrangement of fluid conducting devices to the valve 76. The connector can comprise a wide range of structures including plumbing connections, piping, tubing, manifolds, and valves to start and stop the fluid flow, or any other fluid connection structures. The scale communicates with the controller regarding the weight of the tank 12. The controller also controls the vacuum pump 58, a second sensor 148 and compressor 56.

FIGS. 5a and 5b shows a fragmentary view of a portion of the refrigerant recovery unit 10. The refrigerant recovery unit 10 is fitted with fittings, for example R134a fittings 154, 156 to provide a connection for vehicle service hoses (similar to the connections on a vehicle refrigerant system 124). In a retrofit application, nuts 158, 160 are first installed with first fittings 162, 164, and then the R134a adapter fittings 154, 156 are connected to the fittings 164, 162, respectively. Nuts 158, 160 also have second fittings 168 and 170 (FIG. 7B) on the opposite sides of first fittings 162, 164. The first fittings 162, 164 and second fittings 168, 170 communicate with each other so that when the fluid hose 166 are coupled to second fittings 168, 170 a closed circuit loop is formed in the unit 10. Vehicle service couplers 26, 30 (FIG. 7) located at the ends of vehicle service hoses 24, 28, respectively are coupled to the fittings 154, 156 provided on the refrigerant recovery unit 10.

Figure 6A:
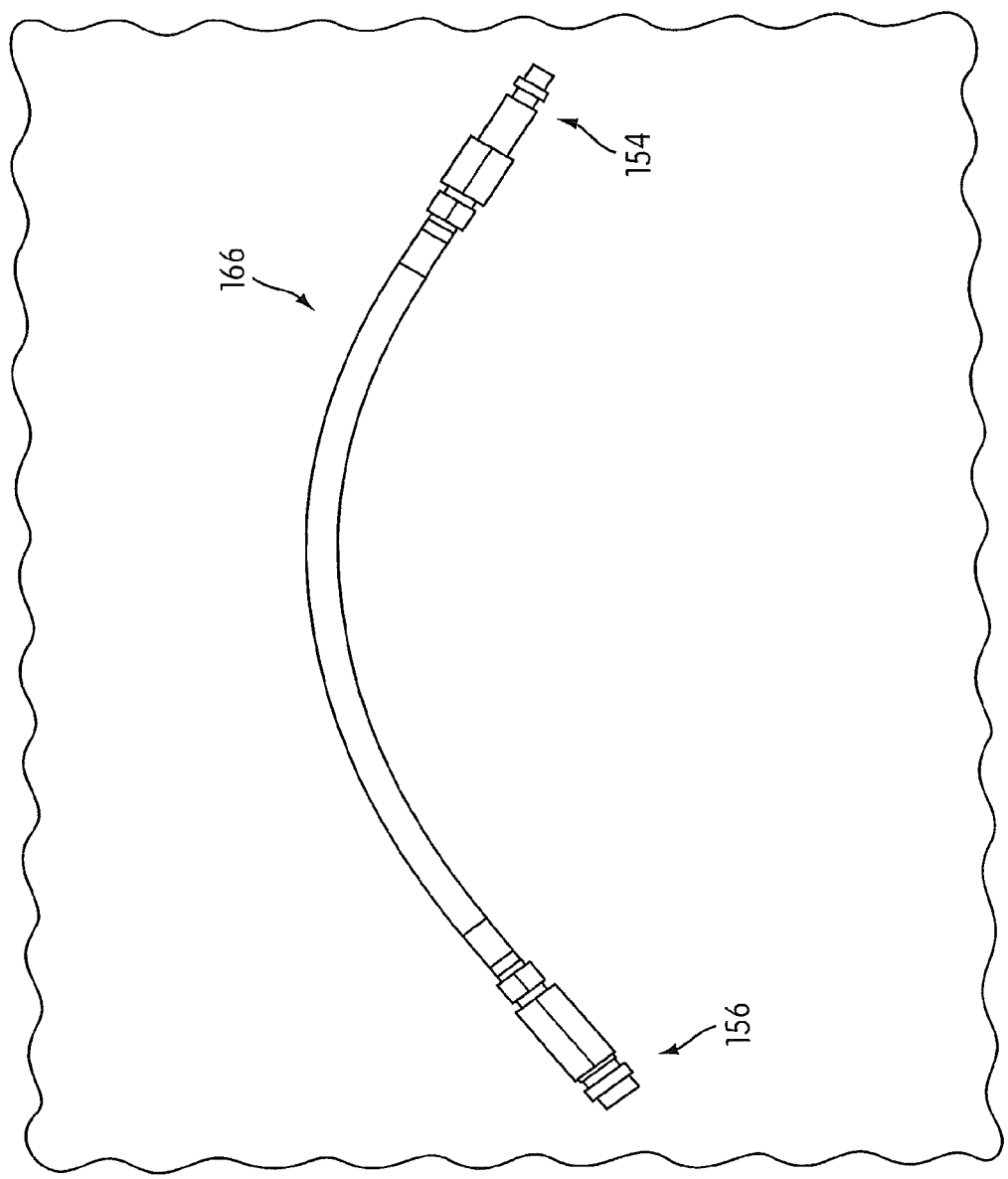
FIG. 6a is an example embodiment of a fluid connector that is a flushing hose with adapter fittings attached thereon.
Figure 6B:
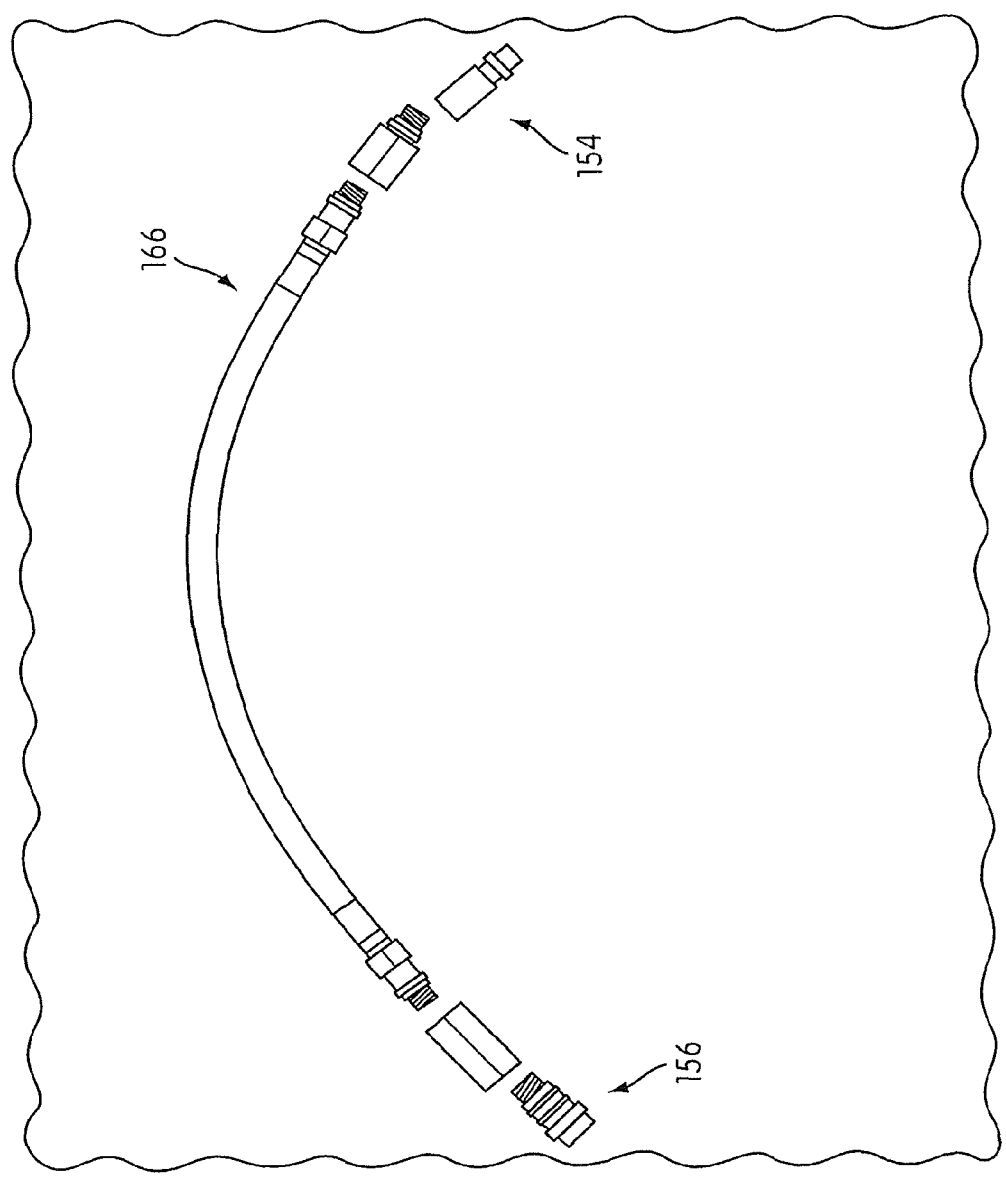

FIGS. 6a and 6b show an example of a retrofit kit with the fluid hose device 166. The fluid hose 166 may be factory installed on a new R-134a refrigerant recovery unit or may be offered as a retrofit adapter option to existing units. The fluid hose ends are configured to mate with second fittings 168, 170 to form the closed loop of unit 10 for the flushing of the service hoses. In this embodiment, refrigerant may flow from the unit 10 out to the hoses 24 to service couplers 26, which is coupled to first fittings 164. The refrigerant then can flow to second fittings 170 then to second fittings 168 to service coupler 30 and hose 28 and back into the unit 10. The refrigerant flow may also be reversed.

In another embodiment, the vehicle service couplers 26, 30 do not have to couple to the fittings 154, 156 but can be coupled together by a bypass adapter (not shown). In this embodiment, one side of the bypass adapter is configured to mate with service coupler 26 and the second side is configured to mate with service coupler 30. When not in use, the bypass adapter may be stored in the unit for later retrieval.

Figure 7A:
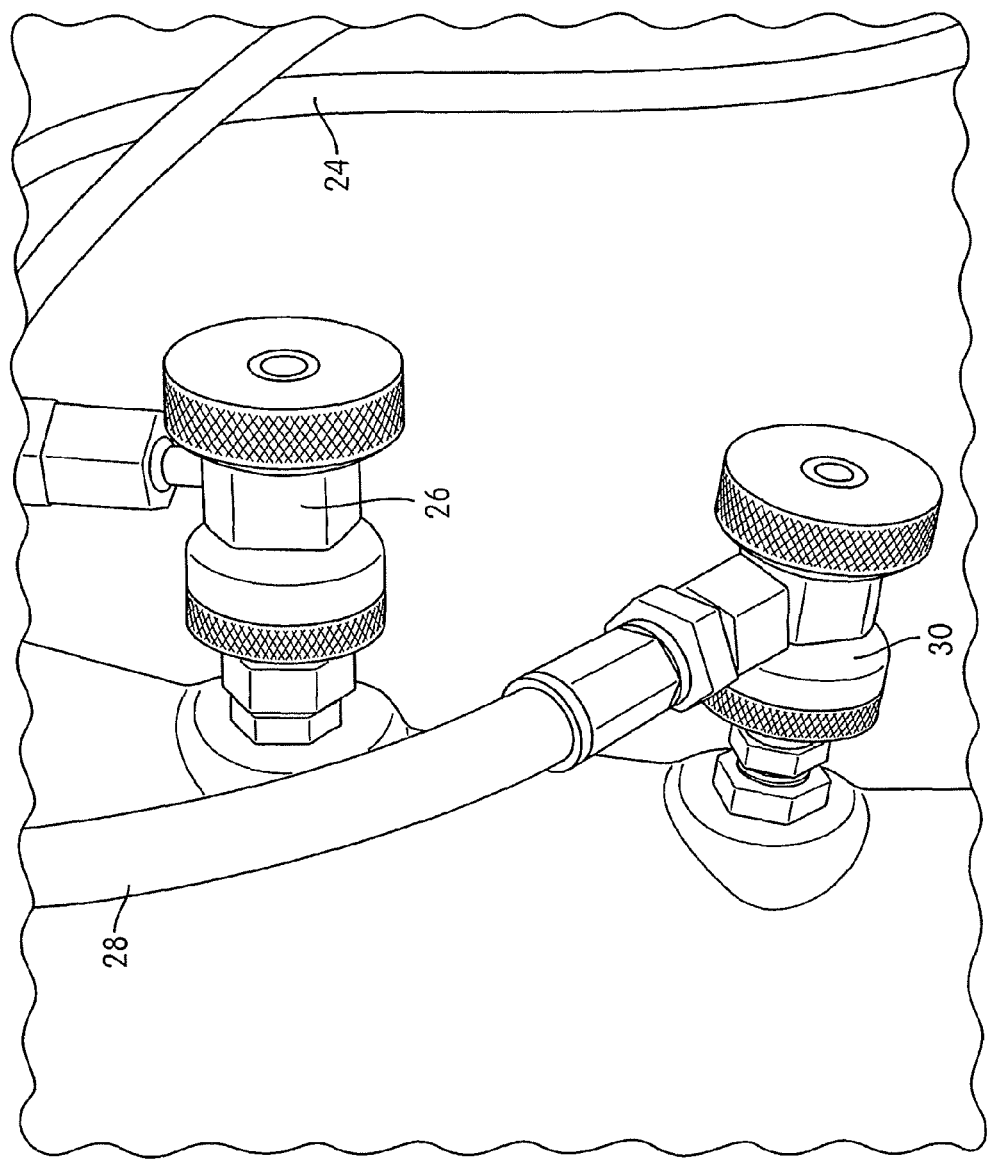
FIG. 7a is a fragmentary view of the refrigerant recovery unit in FIGS. 1, and 2 showing vehicle service couplers carrying vehicle service hoses attached to the adapter fittings shown in FIG. 5b.
Figure 7B:
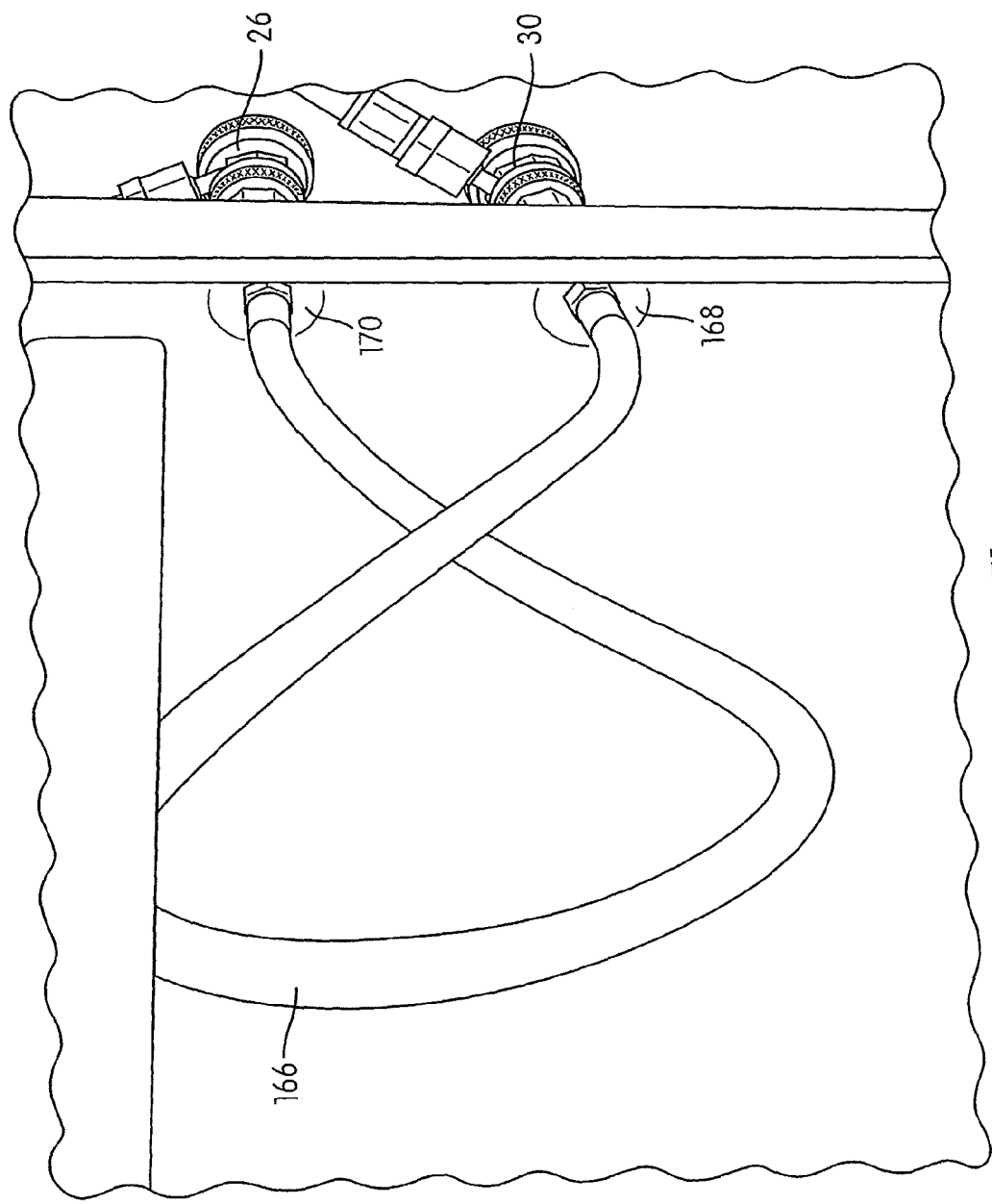
FIG. 7b is a fragmentary view of the refrigerant recovery unit in FIGS. 1, and 2 showing the connecting device shown in FIGS. 6a and 6b attached to refrigerant recovery unit.

FIG. 7a shows a fragmentary view of a portion of the refrigerant recovery unit configured with vehicle service hoses 24, 28 having vehicle service couplers 26, 30 attached thereto, respectively. FIG. 7b shows the fluid hose 166 attached to the vehicle service couplers 26, 30 via second fittings 168, 170 on the refrigerant recovery unit 10. Thus, with this arrangement, oil and other contaminants can be flushed from the vehicle service hoses 24, 28 and the associated refrigerant control circuit by providing a fluid flow connector means or fluid hose 166 between the vehicle service hoses 24, 28 when the vehicle service hoses 24, 28 are disconnected from the vehicle. This flow connection allows the refrigerant recovery unit 10 to flush clean refrigerant through the service hoses 24, 28 and the associated refrigerant circuitry acting as a solvent to clear PAG oil from the service hoses 24, 28 and refrigerant control circuitry to be captured and drained.

Figure 8:
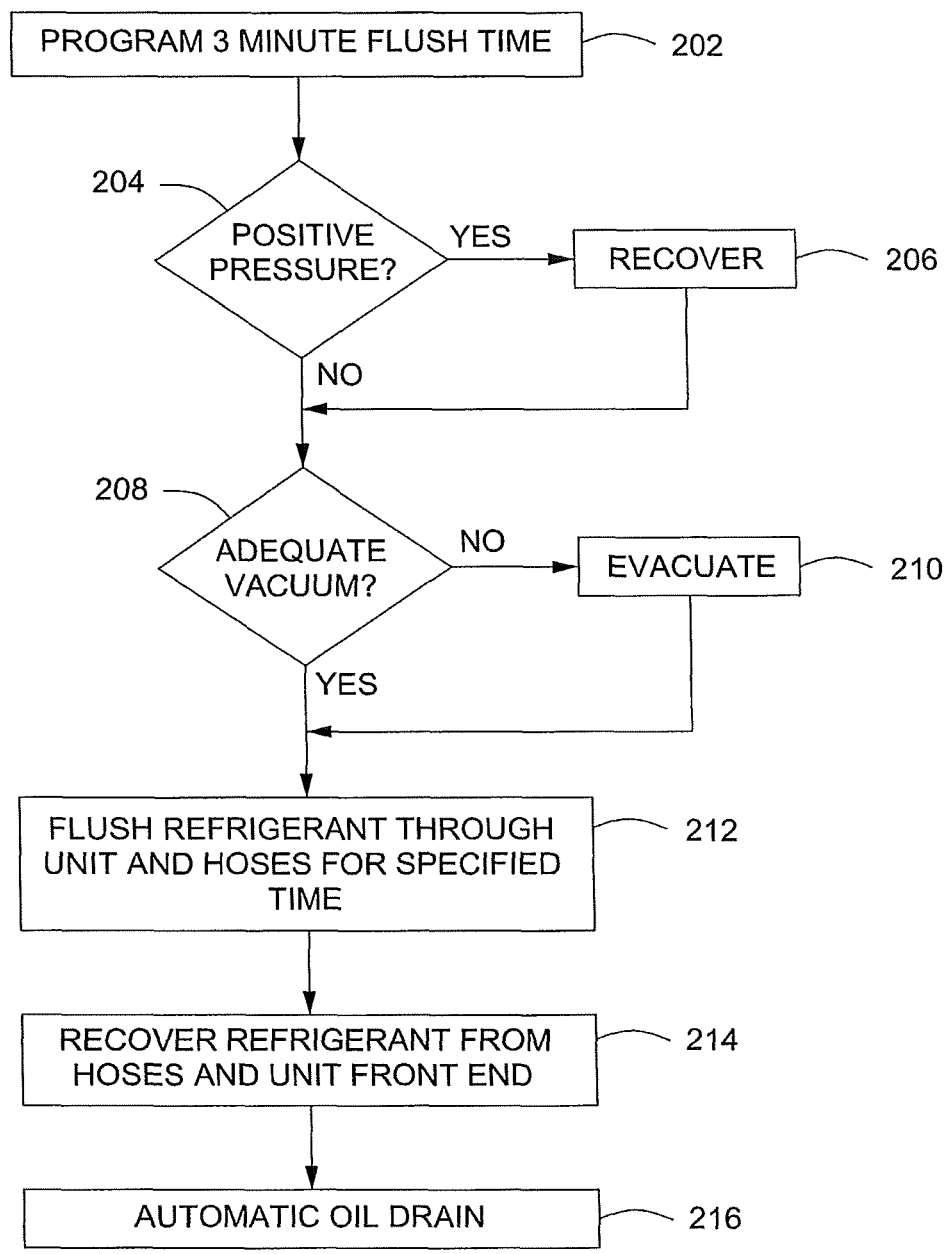
FIG. 8 is a flow chart illustrating an example of operations that may be performed by a refrigerant recovery unit according to an embodiment of the invention.

Having described the main components and function of refrigerant recovery unit 10, the method to flush contaminants from the hoses will not be explained. An example of an operation 200 that may be performed by a refrigerant recovery unit to flush the oil contaminant from the vehicle service hoses is illustrated in FIG. 8. All or part of the steps below may be performed by a software or interactions with the user. As shown in FIG. 8, the operations begins at step 202, where the unit can be programmed to have a 3 minute flush time. Then the software determines if there is positive pressure in the service hoses at step 204. The software can determine the pressure in the hoses with a sensor. If yes or positive pressure, then the unit will enter the recovery mode at step 206. If no, then the software proceeds to step 208 where the software determines if there is an adequate vacuum. If no, then the unit will start to evacuate using the vacuum pump at step 210. If yes, then the software proceeds to step 212, where refrigerant is flushed through the system for a predetermine period of time. This could be 3 minutes. In other embodiments, the time could be 30 seconds to 5 minutes. For other embodiments, the time could be less then 30 seconds and more than 5 minutes. At step 212, the unit can also monitor pressure in case of a no flow error. If there is no flow or inadequate flow, the unit will notify the user and can also be temporarily stopped. At step 214, the unit performs the recovery of refrigerant from the hoses and unit front end. At step 216, the software performs an automatic oil drain. These steps may be performed with the service hoses in a closed loop so that contaminants, such as oil, can be removed from the services hoses.

According to a further embodiment, the oil contamination level can be further reduced by flushing refrigerant through the closed system of the refrigerant control circuit in one direction for part of the time, and in the reverse direction for the remaining period of time. For example, if the total time selected to flush the hoses was three minutes, then refrigerant would be flushed through the hoses for a minute and a half in one direction, and then for a minute and a half in the opposite direction. Varying the flow direction enhances the effectiveness of the refrigerant recovery unit to reduce the oil contamination, and can reduce the oil contamination level to between 500 ppm to 1000 ppm. Thus, only a very small amount of PAG oil may be introduced into the POE system of the hybrid vehicle, if any. Further, during flushing periods described herein, the oil flushed from the service hoses will be separated and collected in the oil separator.

Figure 9:
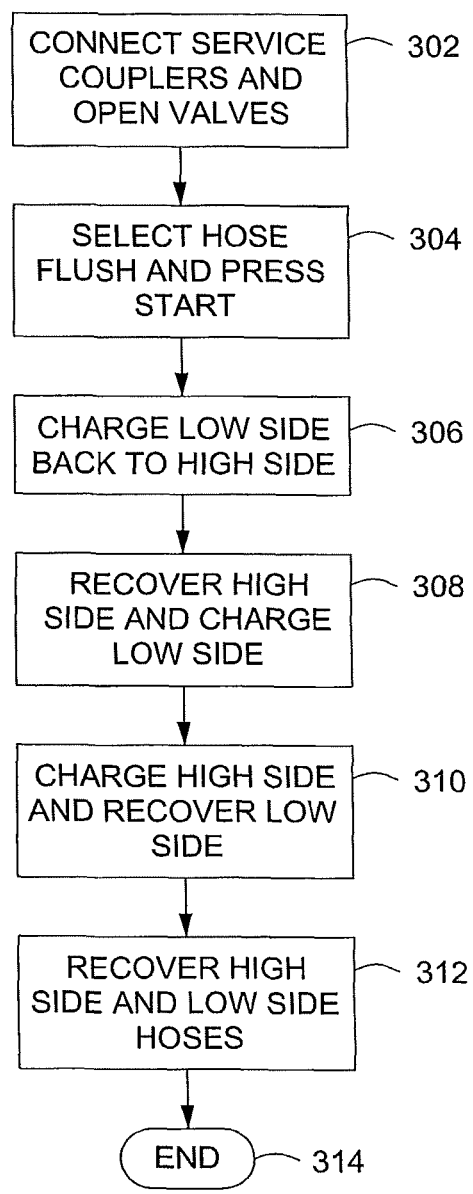
FIG. 9 is a flow chart illustrating another example of operations that may be performed by a refrigerant recovery unit according to an embodiment of the invention.

FIG. 9 illustrates another embodiment of the operations of unit 10. The software operations 300 starts when the user determines that he is about to connect the unit to a vehicle that uses a different type of oil then the vehicle he just completed servicing or previously serviced. The user connects the service couplers to the hose hangers as previously discussed and opens the appropriate valves at step 302 of the couplers. At step 304, the user selects "Hose Flush" and press "Start" on the control panel of the unit. After this step, the unit along with the software can operate the remaining steps automatically. At step 306, the unit charges with refrigerant from the low side connection into the high side connection for about 5 seconds. At step 308, the recovery of refrigerant is begun on the high side while the charging of refrigerant is continuing on the low side. This step continues to flush out the oil from the service hoses. This step is done for about 1 minute. In other embodiments, step 308 can be performed for about 30 seconds to about 2 minutes. In still other embodiments, step 308 can be performed less then 30 seconds and greater than 2 minutes. At step 310, the process of step 308 is reversed and the charging is done on the high side while the recovery is done on the low side. This step is done for about 2 minutes. In another embodiment, step 310 can be performed for about 1 minute to about 5 minutes. In still other embodiments, step 310 can be performed less then 1 minute and greater than 5 minutes. At step 312, charging is stopped and the recovery is now done on both the high and low side. Recovery can continue until about 0 psig and continues for an additional 30 seconds. In another embodiment, the recovery can be done for between about 45 seconds to 2 minutes. In still another embodiment, the additional recovery can be done for less then 30 seconds and more than 2 minutes. The additional time ensures as much oil is recovered as possible from the hoses. The automatic steps ends at step 314.

It can be understood that the method and apparatus for flushing oil and other contaminants from the refrigerant control circuit described and illustrated herein are examples only.

The methods and apparatuses described herein can be used for any refrigerant including R134A, however, the inventions can also be used for HFO1234YF, CO2, and other similar refrigerant systems. It is contemplated and within the scope of the disclosure to construct a wide range of refrigerant recovery units to meet particular design and requirements in a wide range of applications. A refrigerant recovery unit may be fitted with a single vehicle service hose, for example, to accommodate refrigerant systems having only one port to charge and recover from, and the refrigerant recovery unit may be modified accordingly to flush the one hose. The hose(s) may be fitted with fittings other than R134a fittings, such as where other types of refrigerant is used. The construction of the fluid hose for connecting the pair of fluid transmitting ports may have different dimensions or configurations from that illustrated, and its size and shape may vary. The fluid hose may have fittings other than J639 type vehicle ports, and the fluid connector may be bypassed entirely.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of removing contaminants from a refrigeration recovery unit comprising the steps of:
    connecting a first end of a high side service hose and a first end of a low side service hose to a first portion of the unit that provides a refrigerant to the service hoses;
    connecting a second end of the high side service hose and a second end of the low service hose to a second portion of the unit so that the second ends form a closed loop;
    charging the low side service hose with the refrigerant, wherein the refrigerant flows into the high side service hose;
    recovering refrigerant from the high side service hose while continuing to charge the low side service hose;
    charging the high side service hose with refrigerant while recovering refrigerant from the low side service hose;
    stopping the charging of the service hoses; and
    recovering refrigerant from the high and low side service hoses until a measured pressure reaches 0 psig.

2. The method according to claim 1 further comprising continuing to recover for an additional 30 seconds after the pressure reaches 0 psig.

3. The method according to claim 1, wherein the charging, recovering and stopping steps are performed automatically.

4. The method according to claim 1 wherein the connecting step further comprises using a coupler to connect the first ends and the second ends.

5. The method according to claim 1 further comprising separating an oil from the recovered refrigerant into an oil container of the refrigerant recovery unit.

6. The method according to claim 1 further comprising opening valves at the second ends of the hoses to allow the refrigerant to flow there through.

7. The method according to claim 1, wherein the recovering of refrigerant is done with a vacuum pump.

8. A method to flush a contaminant from service hoses of a refrigerant recovery unit, comprising the steps of:
    connecting a first end of a high side service hose and a first end of a low side service hose to a first portion of the unit that provides a refrigerant to the service hoses;
    connecting a second end of the high side service hose and a second end of the low service hose to a second portion of the unit so that the second ends form a closed loop;
    entering a predetermined amount of time for flushing the service hoses;
    measuring a pressure within the service hoses with a pressure sensor;
    performing a recovery of refrigerant if there is a positive pressure in the service hoses;
    determining if there is an adequate vacuum in the service hoses after the recovery;
    performing an evacuation of the service hoses if the vacuum is inadequate;
    flushing the service hoses with a refrigerant for a predetermined period of time; and
    recovering refrigerant from the service hoses.

9. The method according to claim 8 further comprising monitoring a refrigerant flow during flushing.

10. The method according to claim 9, wherein if the flow is below a predetermined level of flow, the flushing step is stopped.

11. The method according to claim 8, wherein the flushing step further comprises circulating refrigerant in one direction of the closed loop and circulating refrigerant in a second direction of the closed loop.

12. The method according to claim 11, wherein the refrigerant flows in the first direction for approximately a minute and a half, and flows in a second direction for approximately another minute and a half.

* * * * *